United States Patent [19]

Robichaud

[11] Patent Number: 4,764,275
[45] Date of Patent: Aug. 16, 1988

[54] FLUID FILTER AND METHOD FOR ATTACHING SAME IN SEALING RELATION TO A FILTER MOUNT

[76] Inventor: Arthur W. Robichaud, 85 Ridge Rd., Rumson, N.J. 07760

[21] Appl. No.: 791,353

[22] Filed: Oct. 25, 1985

[51] Int. Cl.$^4$ ............................................. B01D 27/08
[52] U.S. Cl. ...................................... 210/232; 210/440; 210/443; 210/450; 210/DIG. 17; 55/502; 55/504
[58] Field of Search ............... 210/232, 238, 435, 440, 210/443, 450, DIG. 17; 55/502, 504

[56] References Cited

U.S. PATENT DOCUMENTS

| | | | |
|---|---|---|---|
| 2,185,281 | 1/1940 | Tear | 210/178 |
| 3,000,506 | 9/1961 | Hultgren | 210/DIG. 17 |
| 3,076,551 | 2/1963 | Humbert, Jr. | 210/232 |
| 3,225,927 | 12/1965 | Sicard | 210/232 |
| 3,256,989 | 6/1966 | Hultgren | 210/DIG. 17 |
| 3,333,703 | 8/1967 | Scavuzzo et al. | 210/DIG. 17 |
| 3,380,476 | 4/1968 | Torres | 137/614.05 |
| 3,411,632 | 11/1968 | Offer et al. | 210/440 |
| 3,490,594 | 1/1970 | Hutchins, Jr. | 210/232 |
| 3,502,221 | 3/1970 | Butterfield | 210/444 |
| 3,561,725 | 2/1971 | Torres | 251/149.2 |
| 3,616,933 | 11/1971 | Baldwin | 210/DIG. 17 |
| 3,847,819 | 11/1974 | Firth | 210/444 |
| 4,052,307 | 10/1977 | Humbert, Jr. | 210/130 |
| 4,349,438 | 9/1982 | Sims | 210/238 |
| 4,364,829 | 12/1982 | Atkins et al. | 210/238 |
| 4,465,595 | 8/1984 | Cooper | 210/238 |
| 4,473,471 | 9/1984 | Robichaud et al. | 210/443 |
| 4,497,706 | 2/1985 | Pickett et al. | 210/130 |
| 4,541,265 | 9/1985 | Dye et al. | 72/349 |
| 4,559,170 | 7/1986 | Friedman et al. | 210/223 |
| 4,654,142 | 3/1987 | Thomsen et al. | 210/232 |

FOREIGN PATENT DOCUMENTS

| | | |
|---|---|---|
| 229092 | 8/1963 | Austria . |
| 639408 | 4/1962 | Canada ....................... 210/DIG. 17 |
| 2326212 | 12/1974 | Fed. Rep. of Germany . |
| 1302232 | 7/1962 | France . |
| 982466 | 2/1965 | United Kingdom ....... 210/DIG. 17 |
| 982548 | 2/1965 | United Kingdom . |

OTHER PUBLICATIONS

EPC Search Report dated Mar. 25, 1988.

Primary Examiner—Richard V. Fisher
Assistant Examiner—Wanda L. Millard
Attorney, Agent, or Firm—Staas & Halsey

[57] ABSTRACT

A fluid filter and a method for attaching same to a filter mount of an engine in sealing relation is provided. The fluid filter include a filter media; a housing for the filter media; complimentary interengageable locking devices formed radially on the filter and filter mount for engaging the filter and the filter mount; and a seal positioned between the housing and the filter mount. The locking devices include either: a first set of circumferentially spaced flanges formed on the inner wall of the housing and a second set of circumferentially spaced flanges formed on the filter mount; or a plurality of bolts attached to the filter mount or a plate attached to the housing and a corresponding plurality of holes formed in the plate or filter mount, respectively. The sealing means includes an annular, O-ring positioned between the housing and the filter mount. The method includes the steps of: forming either of the above-described fluid filters; and either inserting the first set of flanges between the second set of flanges or, inserting each of the plurality of bolts into one of the corresponding plurality of holes, and turning the filter a quarter turn to engage the filter and the filter mount.

16 Claims, 4 Drawing Sheets

FLUID FILTER AND METHOD FOR ATTACHING SAME IN SEALING RELATION TO A FILTER MOUNT

BACKGROUND OF THE INVENTION

This invention relates to a fluid filter, such as a disposable-type, oil filter, and a method for attaching same in sealing relation to a filter mount on an engine.

The type of fluid filter now commonly used as an oil filter for motor vehicles is the "spin-on," disposable-type, because it is relatively inexpensive to mass produce and easy to install and replace. Such a spin-on, disposable-type, fluid filter is shown in FIG. 1 herein and is indicated generally by reference number 10. This filter 10 includes a housing 11 having a cylindrical side wall 12, a shaped closed end 14 for cooperation with a filter wrench (not shown), and an opposite, open end 15 covered with an end plate or wall 16 having oil flow openings 18 formed therein to allow oil to flow into the filter 10. An annular, resilient, sealing gasket 20 is retained in an annular channel 22 formed on the end wall 16 for cooperation with a flat sealing surface 24 of a filter mount 26 to which the filter 10 is attached. The filter mount 26 is formed on an engine 28 and also includes oil flow openings 34. Located centrally of the end wall 16 is a threaded aperture 30 which receives a threaded stud 32 carried by the filter mount 26.

During normal operation, flow of oil is from the engine 28, through the oil flow openings 34 formed in filter mount 26, into the oil flow openings 18 formed in the end wall 16, through an antidrain back and bypass valve (not shown), through the filter media 36, through the center tube (not shown), through the central aperture 30, into the hollow interior 38 of the stud 32 and back to the engine 28. In the "bypass" mode, the anti-drain back and by pass valve causes the oil to bypass the filter media 36 and the center tube.

The common and continuing problems of this conventional spin-on, disposable filter are discussed below.

First, when the filter 10 is attached to the filter mount 26, friction, twisting, and compressive forces act on the sealing gasket 20 positioned between the end wall 16 and the filter mount 26. As a result, the sealing gasket 20 can become deformed or can be caused to lie "off-center" of the channel 22. In addition, the quality of the seal deteriorates with time and temperature aging of the sealing gasket 20 requires a high torque to remove the filter 10.

Second, the sealing gasket 20 is of the compression type where the hydraulic load works against the sealing surface 24 of the filter mount 26 and the performance of the sealing gasket 20 is a function of the stiffness of the end wall 16. Operational performance is worsened when the sealing gasket 20 is placed at the outer edge of the traditional end wall 16 because the hydraulic load acts to deflect and separate the filter mount sealing surface 24 from the end wall 16. Hence, the sealing gasket 20 must expand to fill this ever-increasing gap. One known technique for improving the strength of the sealing gasket 20 is to incorporate a peripheral, metal ring therein, as taught by co-assigned U.S. Pat. No. 4,473,471, issued to Robichaud et al., however, such a ring cannot fully compensate for this expansion.

Third, installation of the conventional filter 10 is not foolproof. The filter 10 should be torqued after the sealing gasket 20 contacts the filter mount 26; however, it is not possible to positively determine proper contact of the sealing gasket 20 in most conventional installations.

Fourth, due to the great pressures encountered during operation, it is necessary to manufacture the area of attachment of the filter 10 to the filter mount 26, i.e., the end wall 16, from a material whose thickness and strength can withstand these pressures. Of course, a filter design requiring a thick, strong material for the area of attachment results in high raw material and manufacturing costs.

Fifth, since conventional wisdom has counseled that the area of attachment should be at the center of the end wall in the form of corresponding threaded members, the means for sealing the space between the filter and the filter mount has necessarily been restricted to the area surrounding the corresponding threaded members. As a result, manufacturing design freedom and the efficiency of the sealing means has suffered.

Sixth, the total raw material cost of the filtration process components, i.e., filter media 36, related adhesives, etc., is less than a third of the total raw material cost of each filter 10. The remaining two-thirds of the cost is related to the non-filtration process components, i.e., the sealing gasket 20, end wall 16, etc. Due to this disproportional cost ratio, it is highly desired to minimize the cost of the non-filtration process components.

Seventh and finally, the conventional fluid filter 10 requires machining or cutting of various filter parts, such as the threaded stud 32 and central aperture 30. The goal of generating high volume production of fluid filters including thick end walls 16 having quality threads, i.e., without leaving traces of chips and burrs, has posed serious, longstanding problems in the industry.

Thus, it can be seen that the known fluid filters have fluid sealing problems, necessarily demand that relatively thick metal be used in the area of attachment, and are relatively expensive and difficult to manufacture. None of the known prior art fluid filters have the novel features of the invention disclosed herein which overcome these disadvantages.

SUMMARY OF THE INVENTION

In light of the above-mentioned disadvantages in known fluid filters and the methods of attachment related thereto, it is an object of the present invention to provide a fluid filter whose area of attachment to the filter mount is moved radially outward from the center thereof, thus eliminating the end plate, allowing greater freedom in manufacturing design and providing greater overall efficiency of the sealing means.

It is another object of the present invention to provide a fluid filter, whose non-filtration components can be manufactured less expensively than their conventional counterparts.

It is another object of the present invention to provide a fluid filter whose components do not require any machining or cutting, but instead are formed in a press using flatstock.

It is another object of the present invention to provide a fluid filter and method for attaching same capable of producing an extremely effective seal between the filter and the filter mount.

It is another object of the present invention to provide a fluid filter and method for attaching same which are relatively simple and have a minimal number of components and steps, respectively, thereby ensuring low-cost, mass-production.

It is another object of the present invention to provide a fluid filter and method for attaching same capable of easy assembly, thereby enhancing low-cost mass-production.

It is another object of the present invention to provide a fluid filter which can be attached to a filter mount quickly via a relatively easy and fool-proof attaching method.

It is another object of the present invention to provide a fluid filter and method for attaching same capable of providing positive indication of proper installation.

Finally, it is an object of the present invention to provide a fluid filter and method for attaching same capable of prolonging the life and effectiveness of the sealing gasket.

To achieve the foregoing objects and in accordance with the purpose of this invention, as embodied and broadly described herein, there is provided a fluid filter and a method for attaching same in sealing relation to a filter mount. The fluid filter includes: a filter media; a housing for the filter media; complimentary, radial, interengageable locking means formed on the filter and the filter mount for engaging the filter with the filter mount; and sealing means positioned radially outward of the locking means between the filter and the filter mount. The locking means may include a first set of circumferentially spaced flanges attached to the inner wall of the housing and a second set of circumferentially, alternatingly spaced, flanges formed on the filter mount, or vice versa. The locking means may instead include a plurality of bolts attached to the filter mount and a corresponding plurality of holes formed in a plate attached to the inner wall of the filter, or vice versa. The sealing means may include an annular O-ring positioned between the housing and the filter mount. The method includes the steps of forming either of the above-described fluid filters, and either inserting the first set of flanges between the second set of flanges, or inserting each of the plurality of bolts into one of the plurality of corresponding holes, respectively, and turning the filter a quarter turn to engage the filter and the filter mount.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE PREFERRED EMBODIMENTS

Figure 1:
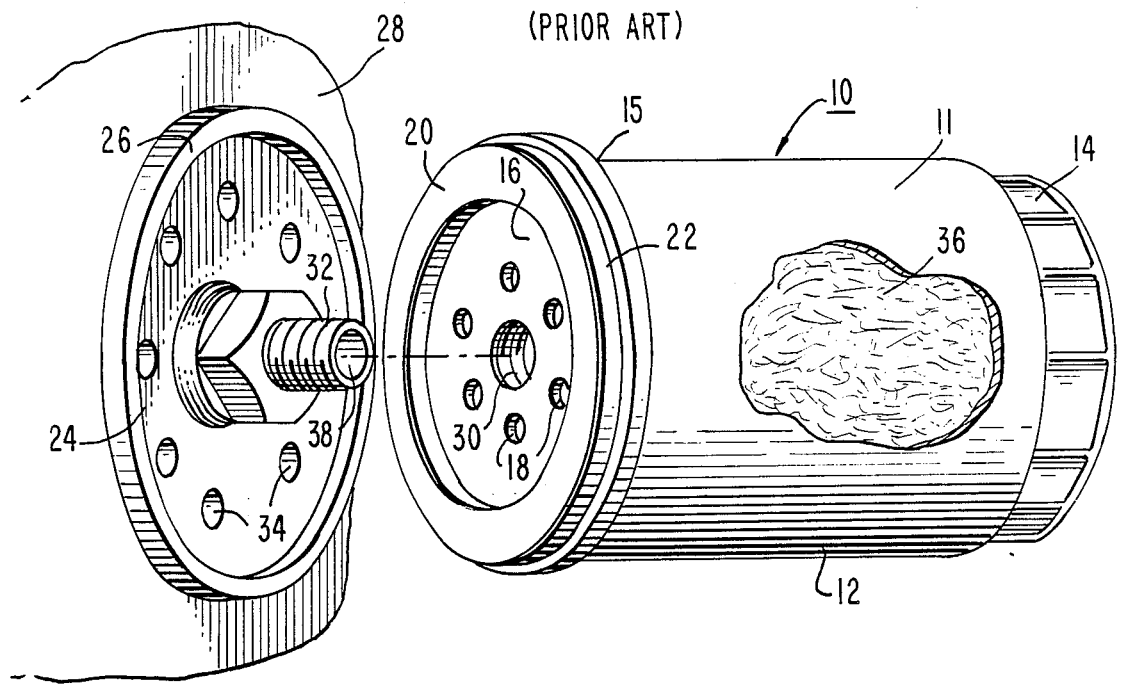
FIG. 1 is a perspective view of a conventional, spin-on, disposable-type, oil filter and the method for attaching same to a filter mount.

The present invention is shown in FIGS. 2-8 herein and includes generally a fluid filter indicated by reference numeral 50, a filter mount 62 and a sealing means 64.

The fluid filter 50 includes a housing 52 provided internally thereof with a filter media 54 terminating in an end cap 55 and forming a center tube 57. The housing 52 is closed at a first end (not shown), as is conventional, and is open at a second end 56. The housing 52 can be made according to co-assigned U.S. Pat. No. 4,541,265, issued to Dye et al., which eliminates the need for a seam in the housing 52. The fluid filter 50 also comprises an antidrain back and bypass valve 58 which can be made according to co-assigned U.S. Pat. No. 4,497,706, issued to Pickett et al. The valve 58 is welded to an end cap 55 and is sealed by resilient gasket 59 against the filter mount 62.

In direct contrast to the conventional, spin-on, disposable-type, fluid filter 10 discussed above, the present invention eliminates the need for an end plate 16 and the threaded central aperture 30 to permit screwing of the fluid filter 10 onto a threaded stud 32 associated with a filter mount 26. Instead, the present invention includes: complimentary interengageable locking means 60 formed radially on the filter 50 and a base or filter mount 62 of an engine 63 for engaging the filter 50 with the filter mount 62; and sealing means 64 positioned between the housing 52 of the filter 50 and the filter mount 62, as will now be described.

Figure 2:
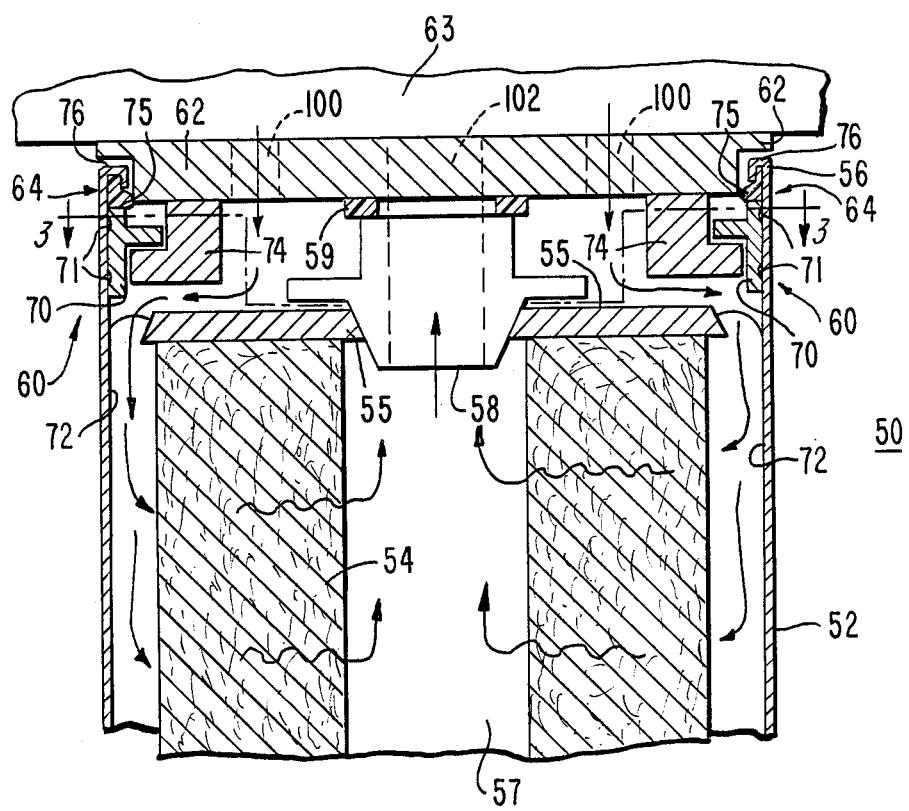
FIG. 2 is a side, cross-sectional view of a first embodiment of the present invention.
Figure 3:
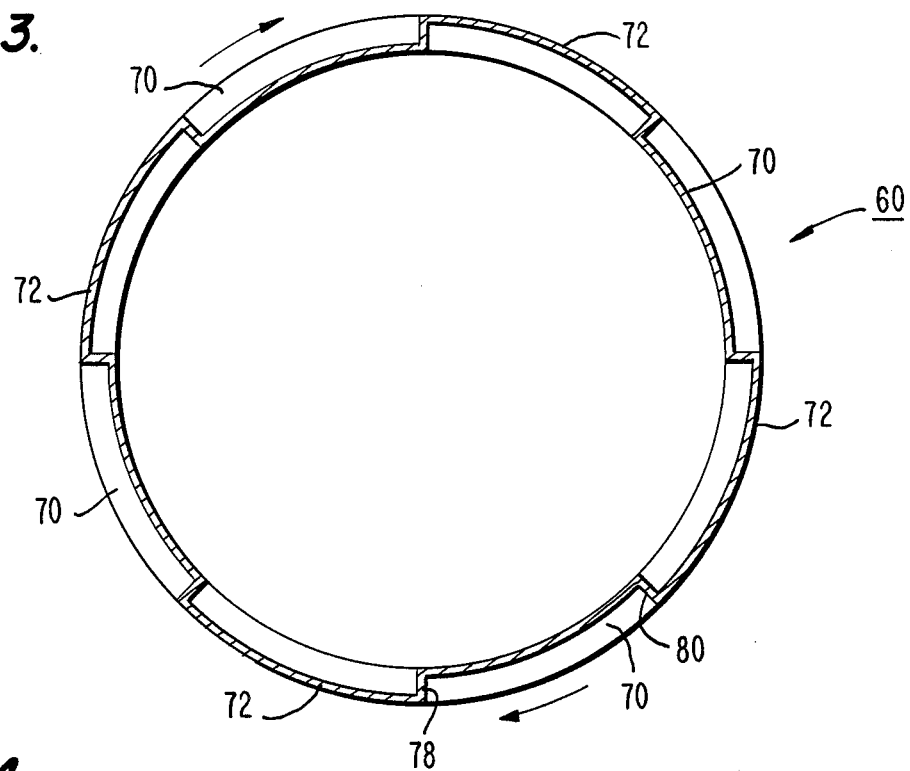
FIG. 3 is a top, cross-sectional view of the present invention shown in FIG. 2 taken along lines 3—3.

In the first embodiment of the present invention shown in FIGS. 2 and 3, the locking means 60 includes a first set of circumferentially spaced projections or flanges 70 attached to the inner wall 72 of the housing 52 via, e.g., welds 71 and a second set of circumferential, alternatingly spaced receptacles or flanges 74 formed on the filter mount 62. The set of flanges 70 may be a hoop lock band which is roll formed from flatstock into a circular "T" section, gapped to allow interface with the gapped filter mount 62 and welded to the housing 52. In this embodiment, the number of flanges 70 and 74 shown is, respectively, four, but other numbers could be used.

By eliminating the conventional end plate, the traditional support area for the sealing gasket is also eliminated. However, the present invention uses unique sealing means which provides a seal superior to that of the conventional sealing gasket.

In this first embodiment, the sealing means 64 may include an annular O-ring 75 positioned circumferentially within a curved end 76 of the inner wall 72 of the housing 52 to abut the filter mount 62. With this sealing means 64, the "high" pressure seal is now circumferential and the pressure and forces exerted tend to actually increase the seal's effectiveness. Therefore, although the pressure is the same in the conventional filter and the filter of the present invention, the force tends to blow out the conventional gasket, but creates a greater seal with the present invention.

More particularly, the present invention emphasizes use of the hoop strength of the housing 52 itself for creating an effective pressure boundary or seal, as opposed to the conventional filter which makes the sealing gasket responsible for withstanding the pressures exerted and maintaining an effective fluid seal. The housing 52 of the present invention has excellent hoop strength to withstand the pressures, whereas the conventional sealing gasket must be pre-loaded against the filter mount and end plate, both of which deflect under pressure. Pre-load for the conventional sealing gasket is accomplished by screwing the end plate closer to the filter mount, thereby compressing the sealing gasket therebetween. The filter mount and the end plate exert further pressure on the sealing gasket when they deflect under pressure. With the present invention, if the locking means 60 deflects, the sealing means 64 is unaffected. In contrast, with the conventional filter, when the filter mount and the end plate deflect, the seal may be broken. Accordingly, the present invention has satisfied a longstanding goal in fluid filter design, i.e., separating the problems associated with sealing from the problems associated with attachment.

FIGS. 2 and 3 also illustrate the method for attachment of this first embodiment. The first step involves forming the filter 50 having locking means 60 and sealing means 64, described above. The second step includes inserting the first set of flanges 70 between the second set of flanges 74, as shown in FIG. 3. Finally, the third step involves merely turning the filter 50 a quarter turn to lockingly engage the first and second sets of flanges 70 and 74. At least one flange of the first set of flanges 70 includes a detent 78 and at least one of the flanges of the second set of flanges 74 includes a corresponding stop 80, which together prevent turning of the filter 50 relative to the filter mount 62 more than a quarter turn. As can be seen, installation is quicker and less guesswork regarding proper torque is required with the present invention than with the conventional filter, since the filter 50 requires only a quarter turn for full and proper installation.

In a second embodiment of the present invention, the above-described structure is merely reversed, such that the first set of circumferentially spaced flanges 70 is formed on the inner wall 72 of the housing 52 and the second set of circumferentially spaced flanges 74 is formed on the filter mount 62. The same sealing means 64 could also be used.

The method of attachment of this second embodiment is similar to that of the first embodiment in that the first set of flanges 70 is inserted between the second set of flanges 74 and the filter 50 is turned a quarter turn to engage the filter 50 and the filter mount 62.

During operation of the first and second embodiments described above, the normal flow of oil is from the engine 63, through the oil flow openings 100 in the filter mount 62, through the filter media 54, through the center tube 57, into the antidrain back and bypas valve 58, into the central opening 102 formed in the filer mount 62 and back into the engine 63. In the "bypass" mode, the antidrain back and bypass valve 58 causes the oil to bypass the filter media 54 and the center tube 57.

Figure 4:
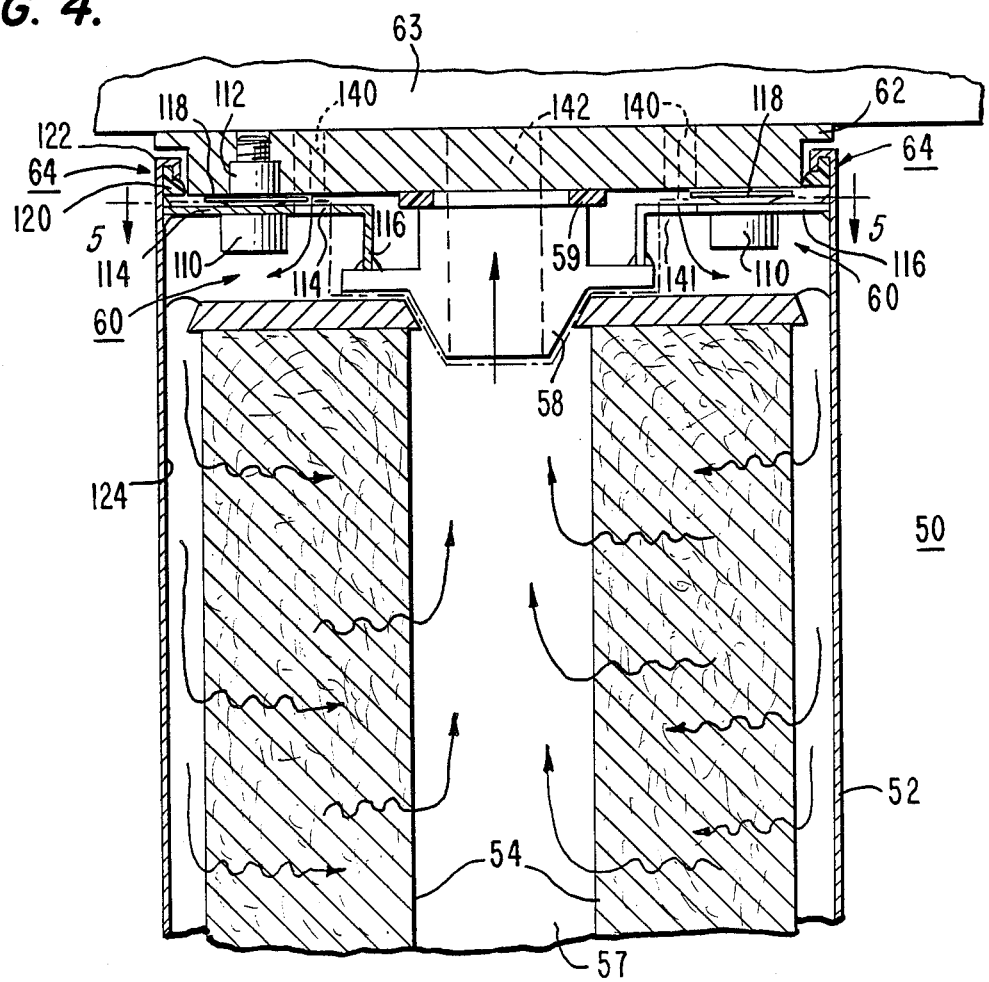
FIG. 4 is a side, cross-sectional view of an alternate embodiment of the present invention.
Figure 5:
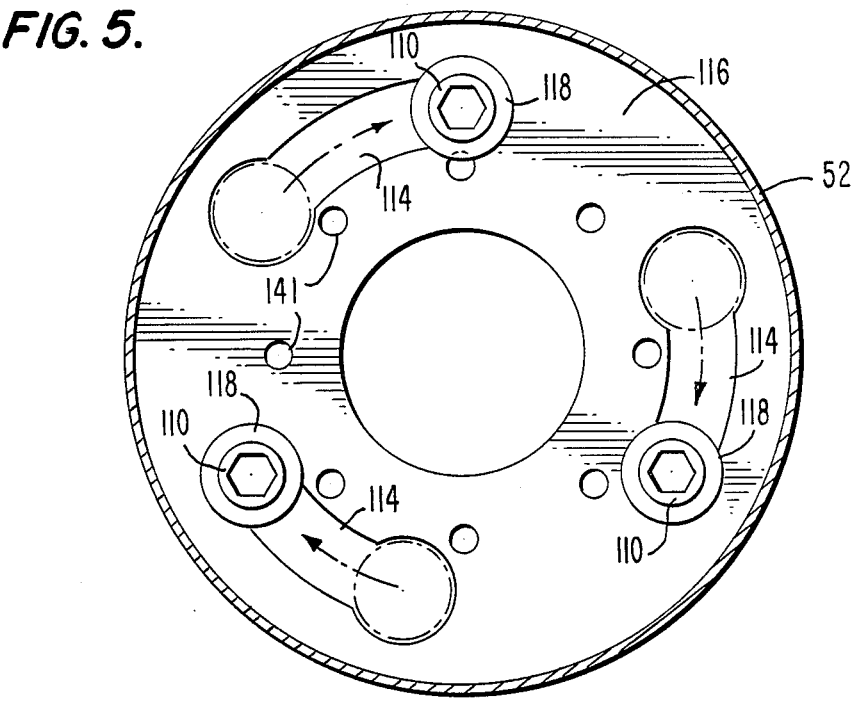
FIG. 5 is a top, cross-sectional view of the present invention shown in FIG. 4 taken along lines 5—5.

In a third embodiment shown in FIGS. 4 and 5, the locking means 60 includes a plurality of bolts 110 attached to the filter mount 62 via nuts 112 and a corresponding plurality of elongated holes 114 having one end larger than the other formed in a plate 116 attached to the housing 52. Each hole 114 is associated with a wave or bevel spring 118 to resiliently receive each bolt 110. In this embodiment, the number of bolts 110 and hole 114 combinations shown, respectively, is three, although other numbers can be used. The sealing means 64 may again include an annular O-ring 120 held within a curved end 122 of the inner wall 124 of the housing 52 to abut the filter mount 62.

FIGS. 4 and 5 also illustrate the method of attachment of this third embodiment. The first step is to form a filter 50 according to the third embodiment described above. Second, each of the plurality of bolts 110 is inserted into the large end of the corresponding holes 114 formed in the end wall 116 against the spring 118 and filter 50 is turned one quarter turn to move each bolt 110 into the smaller end of each hole 114, which resultantly engages the filter 50 and the filter mount 62. The spring 118 acts as a detent load.

In a fourth embodiment, the locking means 60 can merely be the reverse structure of the third embodiment, including the plurality of bolts 110 attached to the plate 116 via the nuts 112 and a corresponding plurality of holes 114 formed in the filter mount 62. Each hole 114 is again associated with a spring 118 to receive each bolt 110 in resilient relation.

The method of attachment of the fourth embodiment of the filter 50 is similar to that of the third embodiment. That is, each of the plurality of bolts 110 is inserted into one of the corresponding holes 114 and the filter 50 is turned one-quarter turn to engage the filter 50 and the filter mount 62.

During operation of the third and fourth embodiments described above, the normal flow of oil is from the engine 63, through the oil flow openings 140 in the filter mount 62, through the oil flow openings 141 formed in the plate 116, through the antidrain back and bypass valve 58, through the filter media 54, through the center tube 57, into the central opening 142 formed in the filter mount 62 and back into the engine 63. In the "bypass" mode, the antidrain back and bypass valve 58 causes the oil to bypass the filter media 54 and the center tube 57.

An added benefit of the locking means 60 of the present invention is the ability to "code" the number of flanges or bolts to a particular original equipment manufacturer. For example, a system could be developed where all General Motors filters could have a universal locking means 60 including three sets of flanges or bolts, whereas Ford Motor Company filters could have four sets of flanges or bolts. As such, using the proper filter for a particular make of automobile is guaranteed.

Alternate embodiments of the sealing means 64 of the present invention will now be described.

Figure 6:
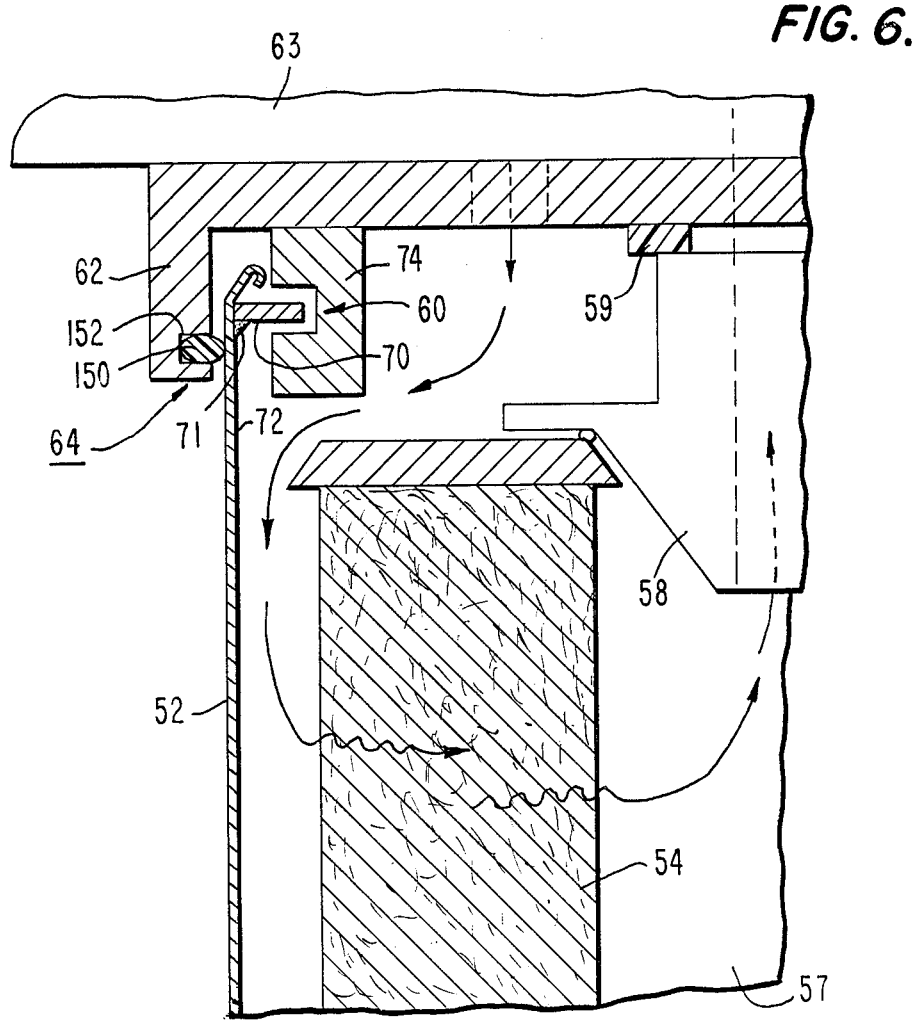
FIG. 6 is a side, cross-sectional view of another embodiment of the present invention.

FIG. 6 shows a second embodiment of the sealing means 64. In this embodiment the sealing means 64 includes an annular O-ring 150 held within a recess 152 formed in a filter mount 62 extending outside of the housing 52. The locking means 60 may include again a first set of circumferentially spaced flanges 70 attached to the inner wall 72 of the housing 52 above the sealing gasket 150 via welds 71 and a second set of circumferential, alternatingly spaced flanges 74 formed on the filter mount 62. With this structure, even if a hole is created in the housing 52 during welding, the sealing means 64 maintains the fluid seal. An added important benefit of this embodiment is that during operation, the housing 52 expands under pressure at the open end thereof to abut the O-ring 150, which improves the seal by exerting pressure against the O-ring 150.

With this O-ring 150, the "high" pressure seal is again circumferential and the pressure and forces exerted tend to actually increase the seal's effectiveness. Therefore, although the pressure is the same in the conventional filter and the filter of the present invention, the force tends to blow out the conventional gasket, but creates a greater seal with the present invention, as discussed above.

Figure 7:
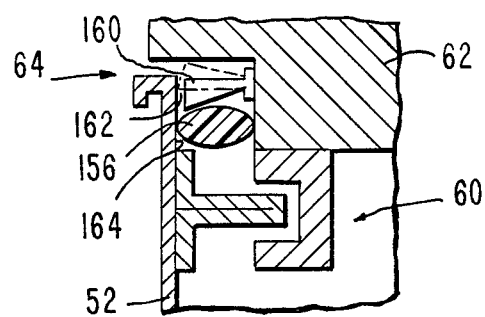
FIG. 7 is a side, cross-sectional view of another embodiment of the present invention.

FIG. 7 shows another sealing means 64 made possible by the overall unique combination of the present invention. This sealing means 64 comprises an "O"-ring 156 and a hinged, flexible member 160 made of metal or plastic. The member 160 is positioned against the filter mount 62 above the O-ring 156 such that, before operation of the filter 50, a gap 162 exists between the member 160 and the inner wall 164 of the housing 52. However, during operation of the filter 50, oil pressure causes the flexible O-ring 156 to move upward against the member 156, which closes the gap 162 as shown in phantom lines in FIG. 7

Figure 8:
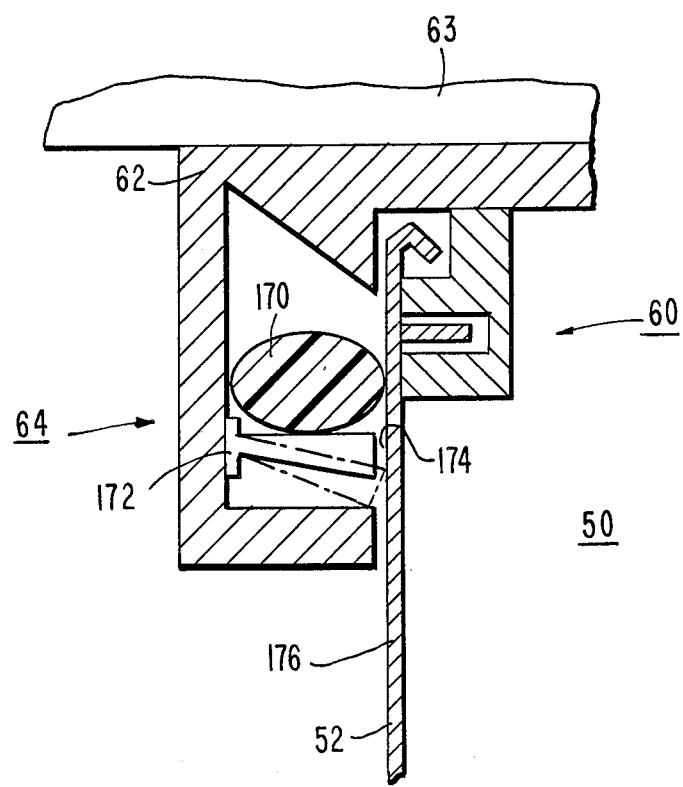
FIG. 8 is a side, cross-sectional view of still another embodiment of the present invention.

FIG. 8 shows still another sealing means 64 of the present invention, similar to that shown in FIG. 7. This sealing means 64 comprises an "O"-ring 170 and a hinged, flexible member 172 made of metal or plastic. The member 172 is positioned between the housing 52 and the filter mount 62 exterior thereto, below the O-ring 170. Before operation of the filter 50, a gap 174 exists between the member 172 and the outer wall 176 of the housing 52. However, during operation of the filter 50, oil pressure causes the flexible O-ring 170 to move downward against the member 172 which closes the gap 174 of the flexible member 156 as shown in phantom lies in FIG 8.

As can be seen from the above description, this invention solves the various disadvantages associated with conventional spin-on, disposable fluid filters. As stated above, with the conventional fluid filter, it is not possible to determine proper installation. However, the present invention provides a positive indication of proper installation because the turning of the filter stops after the quarter turn. In addition, the conventional sealing gasket must allow for deflection and be able to support itself in the gap existing between the filter mount and the filter. Even with a metal reinforced sealing gasket, the quality of the seal ages with time and temperature aging causes high take off torque. In contrast, the present invention prolongs the useful life and effectiveness of the sealing gasket since the gasket is required to withstand far less force. Also, because the area of attachment no longer needs to be a threaded end wall, the end wall can be eliminated, resulting in a one-half reduction in the required steel for the non-filtration process components. Thus, the filtration and non-filtration raw material process components are brought into a more preferred 50/50 cost relationship. Even though the end wall is eliminated, the design of the present invention is capable of easily incorporating an antidrain back and bypass valve. In addition, with the present invention, if the fluid filter is going to burst, the bursting will not be due to an end wall/sealing gasket design failure but due to metal defects only. Also, the hydraulic load is carried close to the filter side wall with minimum cantilever. The above-discussed problem of generating high volume filter production with quality threads, i.e., no traces of chips and burrs, is also satisfactorily addressed. That is, the present invention does not require any high tolerance machining or cutting of the filter parts; all components are formed in a press by roll forming flatstock. Finally, welding is used in structural assembly only; no seal requirements exist in the housing itself, and therfore, there are no seal leaks with the present invention.

The foregoing description of the preferred embodiments is considered as illustrative only of the principles of the invention. Further, since numerous modifications and changes will readily occur to those skilled in the art by this description, it is not desired to limit the invention to the exact construction and operation shown and described. Accordingly, all suitable modifications may be resorted to, falling within the scope of the invention as set forth in the claims and the equivalents thereto.

I claim:

1. A fluid filter for attachment to a filter mount of an engine, comprising:
   (a) a filter media;
   (b) a housing, for the filter media consisting essentially of a substantially cylindrical side wall, a closed first end and an open second end;
   (c) complementary interengageable locking means formed radially on the open second end of the filter housing and the filter mount for engaging the filter housing and the filter mount, including a plurality of first members formed on the inside of the filter housing and a plurality of second members formed on the filter mount,
   wherein the plurality of first members includes a first set of circumferentially spaced flanges fixedly attached to the inside of the cylindrical side wall of the filter housing,
   wherein the plurality of second members includes a second set of circumferentially spaced flanges formed on the filter mount, and
   wherein each of the plurality of first members combines with a corresponding one of the plurality of second members to removably engage the filter housing relative to the filter mount; and
   (d) sealing means positioned circumferentially between the cylindrical side wall of the filter housing at the second, open end and the filter mount for creating a fluid seal therebetween.

2. The fluid filter as recited in claim 1, wherein the sealing means is an annular O-ring positioned between the inner wall of the filter housing and the filter mount interior thereof.

3. The fluid filter as recited in claim 1, wherein the sealing means is an annular O-ring positioned between the outer wall of the filter housing and the filter mount exterior thereof.

4. A fluid filter for attachment to a filter mount, comprising:
   (a) a filter media;
   (b) a housing for the filter media;
   (c) complementary interengageable locking means formed radially on the filter housing and the filter mount for engaging the filter housing and the filter mount, including a plurality of first members formed on the inside of the filter housing and a plurality of second members formed on the filter mount,
   wherein the plurality of first members includes a first set of circumferentially spaced flanges formed on an inner wall of the filter housing,
   wherein the plurality of second members includes a second set of circumferentially spaced flanges formed on the filter mount, and
   wherein each of the plurality of first members combines with a corresponding one of the plurality of second members to removably engage the filter housing relative to the filter mount; and (d) sealing means positioned circumferentially between the filter housing and the filter mount for creating a fluid seal therebetween, the sealing means being an annular O-ring positioned between the inner wall of the filter housing and the filter mount interior thereof, wherein the sealing means further comprises a flexible, annular member positioned between the inner wall of the filter housing and the filter mount interior thereof which is movable between a first, non-sealing position and a second, sealing position when the O-ring is under pressure.

5. A fluid filter for attachment to a filter mount, comprising:
   (a) a filter media;
   (b) a housing for the filter media;
   (c) complementary interengageable locking means formed radially on the filter housing and the filter mount for engaging the filter housing and the filter mount, including a plurality of first members formed on the inside of the filter housing and a plurality of second members formed on the filter mount,
   wherein the plurality of first members includes a first set of circumferentially spaced flanges formed on an inner wall of the filter housing,
   wherein the plurality of second members includes a second set of circumferentially spaced flanges formed on the filter mount, and
   wherein each of the plurality of first members combines with a corresponding one of the plurality of second members to removably engage the filter housing relative to the filter mount, and
   (d) sealing means positioned circumferentially between the filter housing and the filter mount for creating a fluid seal therebetween, the sealing means being an annular O-ring positioned between the outer wall of the filter housing and the filter mount exterior thereof,
   wherein the sealing means further comprises a flexible annular member positioned between the outer wall of the filter housing and the filter mount exterior thereof which is movable between a first, non-sealing position and a second, sealing position when the O-ring is under pressure.

6. A fluid filter for attachment to a filter mount, comprising;
   (a) a filter media;
   (b) a housing for the filter media;
   (c) complimentary interengageable locking means formed radially on the filter housing and the filter mount for engaging the filter housing and the filter mount, the locking means including a plurality of bolts attached to the filter mount and a corresponding plurality of holes formed in a plate attached to the filter housing; and
   (d) sealing means positioned circumferentially between the filter housing and the filter mount for creating a fluid seal therebetween.

7. The fluid filter as recited in claim 6, wherein each of the plurality of bolts is engaged resiliently by a spring associated with each of the plurality of holes.

8. The fluid filter as recited in claim 7, wherein the sealing means comprises an annular O-ring positioned between the inner wall of the filter housing and the filter mount interior thereof.

9. The fluid filter as recited in claim 8, wherein the sealing means comprises an annular O-ring positioned between the filter housing and the filter mount exterior thereof.

10. A fluid filter for attachment to a filter mount, comprising:
    (a) a filter media;
    (b) a housing for the filter media;
    (c) complementary interengageable locking means formed radially on the filter housing and the filter mount for engaging the filter housing and the filter mount, the locking means including a plurality of bolts attached to a plate attached to the filter housing and a corresponding plurality of holes formed in the filter mount; and
    (d) sealing means positioned circumferentially between the filter housing and the filter mount for creating a fluid seal therebetween.

11. The fluid filter as recited in claim 10, wherein each of the plurality of bolts is engaged resiliently by a spring associated with each of the plurality of holes.

12. The fluid filter as recited in claim 11, wherein the sealing means comprises an annular O-ring positioned between the inner wall of the filter housing and the filter mount interior thereof.

13. The fluid filter as recited in claim 12, wherein the sealing means comprises an annular O-ring positioned between the filter housing and the filter mount exterior thereof.

14. A method for attaching a fluid filter to a filter mount of an engine, comprising the following steps:
    (a) forming a fluid filter having—
        (i) a filter media;
        (ii) a housing for the filter media, consisting essentially of a substantially cylindrical side wall, a first closed end and a second, open end,
        (iii) complementary interengageable locking means formed radially on the second open end of the filter housing and the filter mount, including a plurality of first members formed interiorly of the filter housing and a plurality of second members formed on the filter mount, and
        (iv) sealing means positioned circumferentially between the cylindrical side wall of the filter housing and the filter mount;
    (b) forming the plurality of first members as a first set of circumferentially spaced flanges fixedly attached to the inside of the cylindrical side wall of the filter housing and the plurality of second members as a second set of circumferentially spaced flanges on the filter mount;
    (c) inserting the first set of flanges between the second set of flanges; and then
    (d) turning the filter housing in a first direction relative to the filter mount to interengage the complementary locking means by combining each of the plurality of first members with a corresponding one of the plurality of second members to removably engage the filter housing and the filter mount with a seal formed between the cylindrical side wall of the filter housing and the filter mount.

15. A method for attaching a fluid filter to a filter mount on an engine, comprising the following steps:
    (a) forming a fluid filter having—
        (i) a filter media,
        (ii) a housing for the filter media,
        (iii) complimentary interengageable locking means formed radially on the filter housing and the filter mount, including a plurality of bolts on the filter mount and a corresponding plurality of holes in a plate attached to the filter housing, and (iv) sealing means positioned circumferentially between the filter housing and the filter mount; and (b) inserting each of the plurality of bolts into one of the corresponding plurality of holes; and (c) turning the filter housing to engage the filter housing and the filter mount.

16. A method for attaching a fluid filter to a filter mount on an engine, comprising the following steps:

(a) forming a fluid filter having—
(i) a filter media,
(ii) a housing for the filter media, (iii) complimentary interengageable locking means formed radially on the filter housing and the filter mount, including a plurality of bolts in a plate attached to the filter housing and a corresponding plurality of holes in the filter mount, and (iv) sealing means positioned circumferentially between the filter housing and the filter mount; and (b) inserting each of the plurality of bolts into one of the corresponding plurality of holes; and (c) turning the filter housing to engage the filter housing and the filter mount.

* * * * *